May 16, 1961 J. A. HURRY 2,984,120
POSITIVE DRIVE POWER TRANSMISSION BELT
Filed Sept. 26, 1958 2 Sheets-Sheet 1

INVENTOR.
JAMES A. HURRY
BY John E. Reilly
ATTORNEY

May 16, 1961 J. A. HURRY 2,984,120
POSITIVE DRIVE POWER TRANSMISSION BELT
Filed Sept. 26, 1958 2 Sheets-Sheet 2

INVENTOR.
JAMES A. HURRY
BY John E. Reilly
ATTORNEY

United States Patent Office 2,984,120
Patented May 16, 1961

2,984,120

POSITIVE DRIVE POWER TRANSMISSION BELT

James A. Hurry, Denver, Colo., assignor to The Gates Rubber Company, Denver, Colo., a corporation of Colorado Filed Sept. 26, 1958, Ser. No. 763,543

5 Claims. (Cl. 74—231)

The present invention is related to the construction and design of a power transmission belt, and has more particular relation to power transmission belting of the positive drive type, incorporating therein a reinforcement member for the flexible elements of the belt so as to make the belt conformable for replacement of a metallic chain in chain drives.

Conventional chains employed in chain drives are generally metallic, consisting of rollers or teeth fabricated with metal connecting links. The metallic chain is normally employed on the lower speed horsepower drives wherein the basic design in metal makes inherent a number of deterrents in the utilization of such chains: wearing of the moving parts, caused by metal-to-metal contact, is serious so that maintenance and replacement is an important economic factor. In addition, the chain is noisy due to the impact caused by the metal-to-metal contact. Also, the chain is generally relatively heavy in comparison to more flexible belting, so that centrifugal and centripetal forces seriously limit the speed of operation. Moreover, since the metal chain operates with metal-to-metal contact, wear is often sufficient in a short time to misalign the indexing pitch of the chain so that it will tend to jump off of the drive, and this may occur long before the chain is actually worn out.

In the past, utilization of a flexible power transmission belt incorporating more resilient materials therein in such a drive has been limited due to the extreme shear stresses generated between the resilient materials and between the resilient materials and load-carrying member in the belt and which tend to cause premature failure of the belt. At the same time, the presence of resilient flexible materials is considered necessary to limit the noise of operation and to permit increased speeds of operation; and accordingly, the present invention contemplates controlling the distribution and effect of stresses caused by engagement of the driving surfaces in a power transmission belt with the driving elements on a sprocket or chain drive. The present invention more specifically contemplates minimizing the effects of such shear stresses, especially in a positive drive belt wherein the positive drive surfaces engaging the teeth tend to set up localized stresses, especially in the resilient members of the belt.

Generally, the positive drive surfaces, or tooth-engaging surfaces in a positive drive belt are backed by some resilient material, such as an elastomer, with a strain-resisting ply located directly above or adjacent to the teeth-engaging surfaces to carry the load imposed on the belt. Due to the resiliency of the material formed around the tooth-engaging surfaces, however, it has been difficult to so design the belt elements that the resilient materials will effectively transfer the stresses imposed thereon directly into the tensile, or strain-resisting, section of the belt; and thus severe stresses are set up in the resilient materials tending to cause separation and early failure. In accordance with the present invention, it is proposed to minimize the effects of shear stresses on the resilient material and to provide for a way of controlling the distribution of the stresses so as to transfer them directly from the resilient material into the tensile section of the belt.

It is therefore an object of the present invention to produce a power transmission belt in which provision is made for supporting the materials in the belt in such a way as to minimize wear on the elements and to prevent early failure without interfering with the other desirable operating characteristics of the belt.

It is another object to provide in a conventional flexible power transmission belt means for supporting the elements forming the belt so as to minimize the effect of shear stresses upon the belt elements, and to properly transmit the stresses imposed thereon into the tensile, or strain-resisting, section of the belt.

It is a further object to provide for a rubber containing power transmission belt of the positive drive type formed in such a way that the rubber-like materials between the positive drive surfaces and stress-resisting layer of the belt are compressed in a predetermined manner, so as to relieve the positive drive surfaces and resilient backing material therefor of the effects of shear stresses, and to transmit these stresses directly into the strain-resisting layer of the belt.

It is still a further object to provide for a power transmission belt of the positive drive type which is operative to function in chain drive applications and which is so formed as to substantially lessen many of the deterrents incident to the use of metallic chains, including noise, wear on the drive surfaces, and loss of indexing; and further, wherein a compressive force is exerted upon the rubber-like materials forming a portion of the belt elements so as to minimize the effects of shear stresses thereon, and to prevent premature failure of the belt in operation.

To accomplish the foregoing objects and advantages of the present invention, it is proposed to incorporate into a power transmission belt of conventional design and construction and composed at least in part of resilient, rubber-like materials, relatively inflexible reinforcing means, preferably in the form of a number of spaced elements connected along the length of the belt member in such a way as to prestress, by imparting a compressive force to, the elements and especially the resilient elements in the belt to a predetermined extent, and in a way such that the resilient materials in the prestressed state will operate to transmit the stresses caused by the exterior forces applied against the driving surfaces of the belt directly into the strain-resisting member. As mentioned, the principles employed in the present invention are specifically directed to belting of the positive drive type and to make the belt capable in many applications for replacing metallic chains.

With the above and other objects in view, the present invention consists of the features of construction, combination and arrangement of parts, hereinafter more fully described and claimed, taken together with the accompanying drawings, in which:

Figure 1:
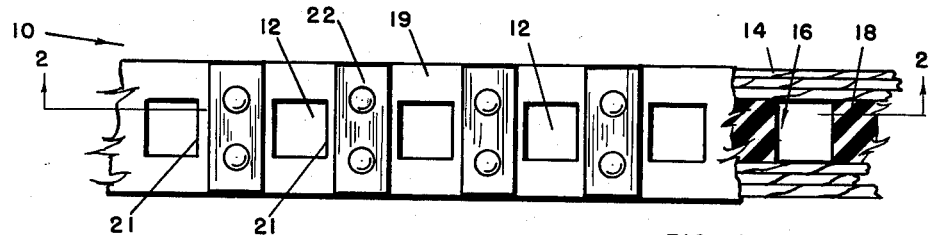
Figure 1 is a top plan view of a portion of a power transmission belt constructed in accordance with the present invention.
Figure 2:
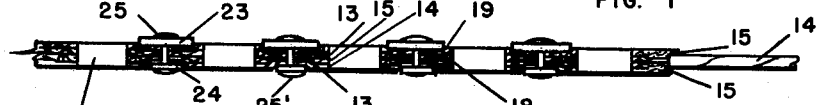
Figure 2 is a vertical section view taken on line 2—2 of Figure 1.

With more particlular reference to the drawings, there is shown by way of illustration, in Figures 1 and 2, a power transmission belt 10 of the positive drive type, wherein the positive drive elements or surfaces are formed by punching or vulcanizing into the belt a series of holes 12 either in single or multiple rows throughout the length of the belt, wherein the holes are properly indexed to the desired pitch for corresponding with and engaging a number of pins or teeth elements in a sprocket, not shown. The holes, or openings 12 may be of any shape, such as round, square, elliptical, or rectangular depending on the design of the sprocket unit, to complete a belt-sheave system of the timing, or positive, type.

The belt 10 as shown is a flat belt comprised of a number of superimposed rubberized fabric plies 13, forming the undercord and the overcord layers of the belt system. The tensile or strain-resisting section of the belt is formed of a single layer 14, or multiple layers, if desired, of an inextensible material such as wire, cord or fabric and the like with the layer 14 being imbedded in the belt by means of adhesion gum layers 15 overlying and underlying the cord layer for bonding to the rubberized fabric plies 13. In high torque applications to which the present invention is specifically directed, it is preferable to employ wire as a strain-resisting element, wherein the wire is wrapped in a continuous layer over the underlying adhesion gum layer in closely spaced relation and is indexed across the width of the belt so as to provide an intermediate, spaced opening as at 16 between the innermost, separated strands of the wire. Due to the absence of wire across the intermediate portion, and to maintain a uniform cross-section in the belt, fabric layers 18 may be laid between the strands of wire so as to form a layer of a thickness the same as the thickness or gauge of the wire. Formed around the individual layers comprising the belt is a suitable fabric wrapper 19 to properly contain the elements forming the belt in desired relation, and to provide a belt having a smooth surface, although of course the belt may be conventionally formed without an outer covering or wrapper.

To form the positive drive surfaces in the belt, the rectangular holes 12, as mentioned, may either be punched or vulcanized into the belt at properly indexed intervals throughout the length to conform to the pitch of the sprocket over which it is to be trained. The openings 12 will thus engage a series of pins or teeth in a sprocket with the impact and force of the pin being taken principally by a rear edge of each opening as at 21 which without support, will thus tend to displace the material spaced between the openings, deform the openings and ultimately cause tearing beginning at the corners of each opening. At the same time, it is highly desirable that the tooth or pin-engaging surface of the belt cushion the impact of the teeth as they come into engagement with the belt member, and for this reason, it is not practical to form any metal reinforcement around the openings which would prevent this cushioning effect and also cause undue noise in operation. Accordingly, it is a principal feature of the present invention to employ sets of compression plates 22 which are spaced intermediately between the openings 12 in a way such that they will not come into direct contact with the teeth on the sprocket, yet will effectively prevent generation of localized stresses around the opening, but instead cause the resilient, rubber-like material to transfer the stresses imposed thereon directly into the strain-resisting layer 14. Again, it has not been found sufficient, especially in high torque applications, merely to dispose inflexible elements similar in design to the compression plates 22 across the belt in reinforcing the edges of the openings 12. However, it has been discovered that by pressing the plates together in connected relation the rubber-like material therebetween is also compressed and prestressed so that the modulus of the rubber-like material is effectively increased, and instead of localized distribution of the stresses into the rubber under deformation, the rubber is so contained between the plates as to force the stresses injected thereto by the teeth directly into the tensile member. To this end, the transverse plates 22 include a series of top plates 23 and bottom plates 24 applied coextensively across the top and bottom surface respectively of the belt member at spaced intervals so as to lie intermediately between the openings 12. Compression means in the form of rivets or bolts 25 may then be inserted through the plates and the thickness of the belt at spaced, transverse intervals across the width of the belt, the bolts being so connected, such as by means of nuts 25', as to compress the plates, together with the material, to a predetermined extent. It has been found preferable to press these plates inwardly as much as 20% of the thickness of the belt to obtain the desired prestressing of the rubber in high torque applications; and of course, the extent of precompression will be directly related to the horsepower requirements and torque applied to the teeth-engaging surfaces. Due to the inflexibility of the compression plates 22 a pair of bolts or rivets may be suitably employed, although of course any number may be applied, and as shown, the rivets are inserted through the thickness of the belt at a point just beyond the sides of the openings, so as to extend through the belt adjacent to the innermost wire strands 16.

It is to be noted that through compression of the plates 22 the rubber-like material will tend to bulge or expand in the area just outside the point of contact with the plate. However, it will be evident that due to the nature of any elastomeric material, the hardness of the material will not be increased, and the cushioning effect of the rubber material adjacent to the opening will be present so as not to interfere with the desired operating characteristics of the belt. However, the rubber is effectively contained in movement, so that instead of deforming under the impact and force-load of the teeth, in a direction tending to tear the edges of the opening, it will transfer the stresses evenly and directly into the tensile or strain-resisting member extending continuously along the sides of the belt, so that the belt will fail under normal wear conditions instead of as a result of the application of shear stresses into the belt.

Figure 3:
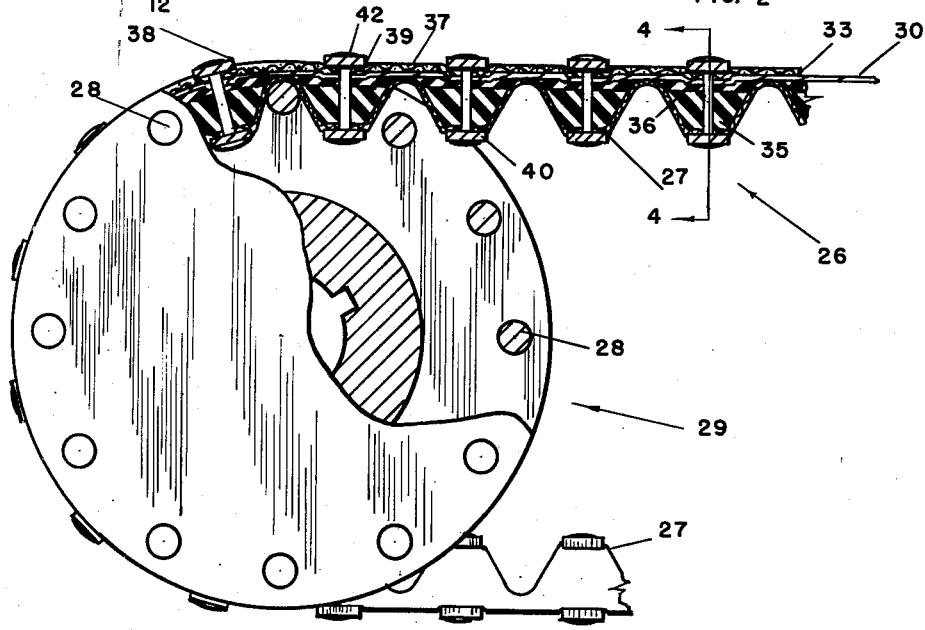
Figure 3 is a fragmentary elevational view of a power transmission drive incorporating a modified form of belt construction, in accordance with the present invention.
Figure 4:
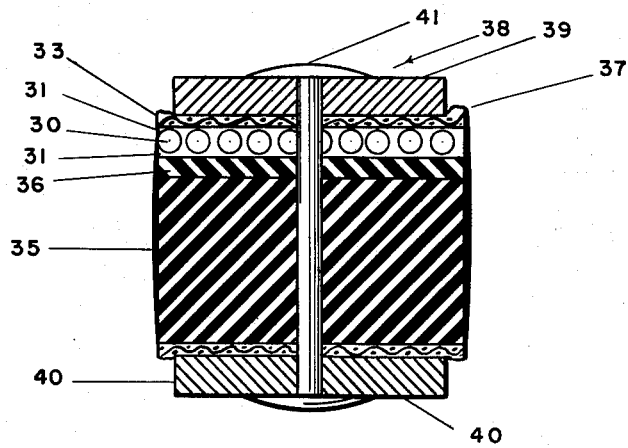
Figure 4 is a vertical section taken on line 4—4 of Figure 3.

There is illustrated in Figures 3 and 4 a modified form of positive drive type belt 26 where, in place of the openings or holes 12, the belt is formed to provide a number of teeth or cog elements 27 for engagement with a number of corresponding pins 28 disposed in a sprocket 29. In accordance with conventional practice, the belt 26 is comprised of a tensile layer 30 which may be formed as before either of fabric or cord, but is preferably of wire extending in continuous helical fashion in a single layer throughout the width of the belt. Adhesion gum layers 31 are formed on either side of the tensile layer 30 with a rubberized fabric overcord layer 33 forming the uppermost layer in the belt. The teeth 27 include a core of rubber-like material, preferably comprised of a lower compression section 35 of a high modulus rubber-like material which forms the body of each tooth, together with an upper cushion section 36 also formed of a resilient, rubber-like material of some intermediate modulus to provide a shock absorbing effect between the compression section 35 and cord layer 33. Formed around the belt elements is an outer fabric wrapper 37 to contain the elements forming the belt. The teeth 27 are, of course, spaced at the proper pitch intervals so as to correspond with the pitch of the pins 28 and the sprocket 29. In this connection, in place of the pins 28, corresponding teeth may be employed to engage the teeth on the belt.

The strain-resisting element 30 is disposed to lie in a plane as closely as possible to the dedendum circle or roots of the teeth; however, some spacing always exists between the two so that it is difficult, under normal construction, to obtain a direct transfer of stresses from the driving surfaces of the teeth 28 into the tensile or strain-resisting layer, without unduly deforming the teeth and imposing undue stresses thereon. Again, to obviate this difficulty, compression plates 38 are provided, having a top plate 39 disposed over each tooth, and a bottom plate 40 along the bottom of each tooth, with the ends of each plate being spaced from the side edges of the belt so as to avoid direct contact with the sides of the sprocket 30 in operation. Rivets or bolts 41 may again be inserted through the thickness of the teeth, together with the plates 39 and 40 and are attached to the plates in such a way as to press the plates inwardly and squeeze the flexible materials therebetween under the compression force applied by the plates. The result of this compression is again to effectively contain and prestress the rubber so as to react against the stresses imposed by the pins 28 and, instead of deforming under the load, act to distribute the stresses directly into the tensile layer. An incidental effect of compression in a belt of this construction is to move the tensile layer as closely as possible to the dedendum circle, and to maintain the elements of the belt in tightly adhering relation.

Figure 5:
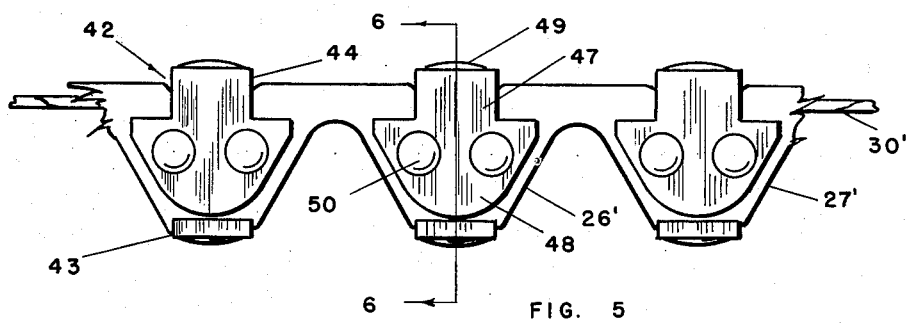
Figure 5 is an elevational view of a portion of another modified form of power transmission belt, in accordance with the present invention; and, Figure 6 is a vertical section view taken on line 6—6 of Figure 5.
Figure 6:
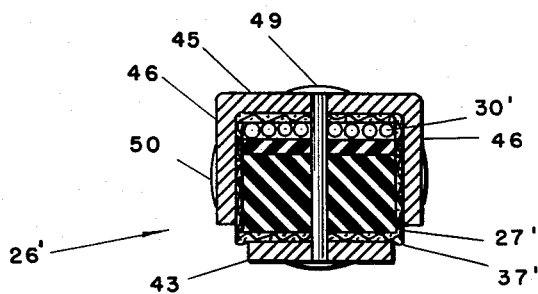

In the modified form of Figures 5 and 6, there is shown a belt 26', similar to that illustrated and described in Figures 3 and 4 wherein compression members 42 are designed to more effectively compress and contain the rubber-like materials. To this end, the compression members 42 comprise flat bottom plates 43 to extend along the bottom of each of the tooth surfaces as before, and upper plates 44 extending at spaced intervals along the length of the belt so as to be coextensive with the bottom plates 43, each upper plate including an intermediate section 45 to engage the top surface of the belt with integrally formed, vertically extending, side plate members 46 extending downwardly from the ends of each intermediate plate section 45. The upper plate 44 is sized so that the top surface portion 45 is of a length equal to the width of the belt, and with the side plates 46 extending downwardly for the greater length of the tooth portion, but in spaced relation to the bottom plates 43 in compressed position.

Each side pate section 46 includes a relatively narrow connecting portion 47 forming a continuation of the top section 45 and terminating in the area between the root portion of each tooth 27' and the tentile section 30', together with a lower support portion 48 conforming generally to the outline of each tooth with the edge thereof lying in spaced relation to each tooth surface. In this way, the side plates will not limit the flexibility of the belt while containing and supporting the elements of the belt.

In applying or assembling the plate members into position around each tooth 27', the top section 45 of the plate 44 may first be connected to the bottom plate 43, such as by means of rivets or bolts 49, so as to compress the belt elements. The initial connection of the bottom plate 43 and top section 45 to compress the elements will, of course, tend to force the sides of the belt in the tooth section outwardly against the surface of the side plate members 46. To more effectively contain the rubber-like material, therefore, rivets 50 are inserted across the width of the belt so as to connect the side plate members and hold them in vertical position against the pressure exerted by the rubber-like material, and to maintain substantially the initial shape of the belt without restricting its flexibility. Of course, the side plates 46 may either be formed as integral parts of either the top or bottom plates, or may be separate therefrom, since the rivets inserted across the width of the belt may be secured sufficiently to maintain the side plate sections in desired vertical spaced relation without necessity of support from either the top or bottom plate members. It will be evident that any conventional materials and methods of fabrication may be employed in the construction of the belt, since it is the combination of the reinforcement or compression plate members with the belt which is the principal feature of the present invention, and primarily the way in which the compression plates are secured to the belt so as to prestress the rubber-like materials, and to work against the localized stresses imposed by the pins or teeth in a sprocket drive. Thus, the plates may either be exposed or imbedded within the belt in a conventional way, followed by pressing the plates inwardly. In addition, the plate members may be formed of any material which will render the necessary inflexibility so as to prevent deformation and misalignment of the rubber when the belt is in operation; for example, mild steel may be employed in the formation of the rivets, or bolts, and the compression plates.

In the form described and shown in Figures 1 to 4, conventional sprocket or pulley drives may be employed without metal-to-metal contact between the compression plates and sides of the pulley. However, in the modified form of Figures 5 and 6 it is preferred to employ a spider-like drive unit having no sides or alternately, disposing the sides so as not to contact the side plates of the belt.

With the use of a belt in place of a chain, as mentioned, many outstanding advantages may be accrued including the fact that in belt drives the rubber-like materials may be chemically modified to avoid chemical reaction with the medium in which it is used. For example, the belt member will be resistant to oxidation and corrosion effects especially along the drive contacting surfaces which is not normally possible with the use of metallic chains.

From the foregoing description, together with the drawings, the construction and arrangement of my improved belt will be readily understood and its advantages appreciated by those versed in the art without a further, and more extensive, description. While there has been disclosed preferred embodiments of the present invention, it is therefore to be understood that variations in the arrangement, construction and design of the parts may be made without departing from the scope of the present invention, as defined by the appended claims.

I claim:

1. A positive drive belt comprising a body composed of resilient material, said belt being provided with at least one row of cog receiving openings spaced along the length of the belt serving to transmit forces from a drive pulley to a driven pulley, a strain resisting member disposed between said openings and each side of said belt, a plurality of pairs of compression plates, each pair including coextensive top and bottom plates disposed transversely across said belt between said openings, and compressing means interconnecting each pair of said plates in inwardly disposed relation with respect to the outer top and bottom surfaces of said belt for exerting a compressive force upon the material between said plates in the areas between said openings.

2. A positive drive belt according to claim 1 in which said strain resisting member is defined by a layer of wire material.

3. A positive drive belt according to claim 1 in which said compressing means is defined by rivet members extending through said belt between said openings.

4. A positive drive belt according to claim 1 in which said compressing means are disposed to force the plates of each pair inwardly toward one another a distance on the order of 20% of the thickness of said belt.

5. A positive drive belt comprising a body constituted of a plurality of superimposed plies of rubberized fabric material, said belt being provided with cog receiving openings spaced along the length thereof intermediately between the side edges of said belt serving to transmit forces from a drive pulley to a driven pulley, a strain resisting member defined by a layer of cord material extending along the length of said belt between said openings and each side of said belt, a plurality of pairs of compression plates, each pair including coextensive top and bottom plates disposed transversely across said belt between said openings, and compressing members interconnecting each pair of said compression plates in inwardly disposed relation with respect to the outer top and bottom surfaces of said belt for exerting a compressive force upon the material between said plates in the areas between said openings, said compressing members extending through said belt adjacent to said strain resisting member.

References Cited in the file of this patent

UNITED STATES PATENTS

| | | |
|---|---|---|
| 826,899 | Smallbone | July 24, 1906 |
| 982,073 | Laird | Jan. 17, 1911 |
| 1,113,438 | Hess | Oct. 13, 1914 |
| 2,066,266 | Geare | Dec. 29, 1936 |
| 2,326,719 | Myers | Aug. 10, 1943 |
| 2,899,242 | Bombardier | Aug. 11, 1959 |

FOREIGN PATENTS

| | | |
|---|---|---|
| 245,291 | Great Britain | Jan. 7, 1926 |